United States Patent [19]

Asada et al.

[11] Patent Number: 4,933,874
[45] Date of Patent: Jun. 12, 1990

[54] PRINTER

[75] Inventors: Kenichirou Asada, Tokyo; Yoshiki Yoshida, Yokohama; Kazuo Murai, Tokyo, all of Japan

[73] Assignee: Ricoh Company, Ltd., Tokyo, Japan

[21] Appl. No.: 330,683

[22] Filed: Mar. 30, 1989

[30] Foreign Application Priority Data

Apr. 7, 1988 [JP] Japan ................................. 63-84184

[51] Int. Cl.[5] ........................................... G01D 15/00
[52] U.S. Cl. ..................................... 364/514; 346/154; 346/160
[58] Field of Search ................... 346/154, 160, 107 R, 346/108, 76 L; 358/300, 302; 364/518, 519

[56] References Cited

U.S. PATENT DOCUMENTS 4,809,025  2/1989  Noguchi .............................. 346/160

Primary Examiner—Arthur G. Evans
Attorney, Agent, or Firm—Oblon, Spivak, McClelland, Maier & Neustadt

[57] ABSTRACT

A printer structure relies on a laser modulator operating in response to image data cooperates with a rotary deflector for deflecting the modulated laser onto a recording medium with the rotation of the rotary deflector being controlled by a predetermined signal. A synchronizer receives the deflected laser irradiated from the rotary deflector in the vicinity of the recording medium and the synchronizer outputs a signal which defines a timing which the laser modulator uses to begin modulation. At least three memories are used which are each capable of storing the image data corresponding to one line defined by one deflection of the rotary deflector and a memory control device controls the writing of the image data inputted from an exterior of the printer in one memory means after switching the one memory to a write operation in synchronization with the rotary signal defining the one line. Subsequently, the image data which is written in the particular one memory is read after switching the one memory to a read operation and transferring the read image data to the laser modulator.

12 Claims, 14 Drawing Sheets

PRINTER

BACKGROUND OF THE INVENTION

The present invention relates to a printer in an image processing apparatus such as a digital copying machine, facsimile, etc.

In general, in an image processing apparatus such as a copying machine, facsimile, etc. provided with a printer using laser beam, when image data are provided from an external equipment to the image processing apparatus, the external equipment starts to transmit the image data having one main scanning amount in synchronization with a horizontal synchronization signal outputted from the printer, and the transmission of the image data having the one main scanning amount is completed until the next horizontal synchronization signal is transmitted.

In accordance with such a construction of the image processing apparatus, the transmission of the image data is controlled on the printer side so that it is necessary for the external equipment to await the input of the horizontal synchronization signal from the printer when the image data are outputted.

Further, it is necessary to dispose a means for adjusting the timing of the output of the image data to connect such printers in parallel to each other by providing a buffer memory for every printer, etc., since the respective printers are not operated in synchronization with each other. In an apparatus disclosed in Japanese Laid-Open Patent No. 62-242909 for example, to synchronize a plurality of rotary polygon mirrors with each other, a control signal is supplied from a common means for generating a frequency signal to a PLL circuit for controlling a drive motor for driving the respective rotary polygon mirrors. However, such an apparatus does not provide any solution about the problems with respect to the transmission of the image data.

The above-mentioned problem is that the external equipment connected to the printer has no information about write scanning speed of the printer, i.e., the rotary speed and the number of mirror faces of deflectors or rotary polygon mirrors. If the time interval in transfer of the image data on one line in the external equipment is shorter than that in the horizontal synchronization signal, the image data on the next line are transferred before the data amount on the one line has been completely written on the printer side so that the printer cannot correspond to these image data.

To correspond to such a situation on the printer side, it is necessary for the printer to have a large amount of buffer memories. Such a large amount of memories must be prepared when the image data on a plurality of pages are transferred.

Japanese published patent No. 62-60870 discloses an apparatus in which a signal for driving the printer is externally supplied. However, in this apparatus, the speed of the printer in a secondary scanning direction is controlled in accordance with the amount of image data, but there is no means for recording or writing out the image data in the main scanning direction.

SUMMARY OF THE INVENTION

It is therefore an object of the present invention to provide a printer in which it is not necessary to dispose a large amount of buffer memories and it is easy to perform a plurality of printing devices in parallel to each other.

The printer of the present invention is a laser printer having a laser modulator which operates in response to image data transferred into the modulator and a rotary deflector for deflecting the modulated laser irradiated from the laser modulator on to a recording medium. The deflector is rotated by control of a rotary signal for a predetermined period. A synchronizer receives the deflected laser from the rotary deflector in the vicinity of the recording medium and outputs a synchronization signal which defines the timing for the beginning of modulation. A plurality of memories are used which each capable of storing the image data corresponding to one line defined by one deflection of the deflector and a controlled device controls the memories for writing the image data inputted from an exterior of the printer in one memory after switching from one particular memory to a write operation in synchronization with the rotary signal defining the particular one line. The image data which is written in any one particular memory is read after switching to a read operation and this read image is transferred to the laser modulator.

Further objects and advantages of the present invention will be apparent from the following description of the preferred embodiments of the invention as illustrated in the accompanying drawings.

As mentioned above, in accordance with the present invention, a deflecting synchronization signal and a line synchronization signal of the printer are provided from the external equipment such that the image data are transferred from the external equipment to the printer. Accordingly, the printer can be efficiently controlled by less memories and a plurality of printers can be easily operated in parallel to each other.

Many widely different embodiments of the present invention may be constructed without departing from the spirit and scope of the present invention. It should be understood that the present invention is not limited to the specific embodiments described in the specification, except as defined in the appended claims.

DESCRIPTION OF THE PREFERRED EMBODIMENTS

The preferred embodiments of a printer in the present invention will now be described with reference to the accompanying drawings.

First, the construction and operation of a general laser printer will be described.

Figure 1:
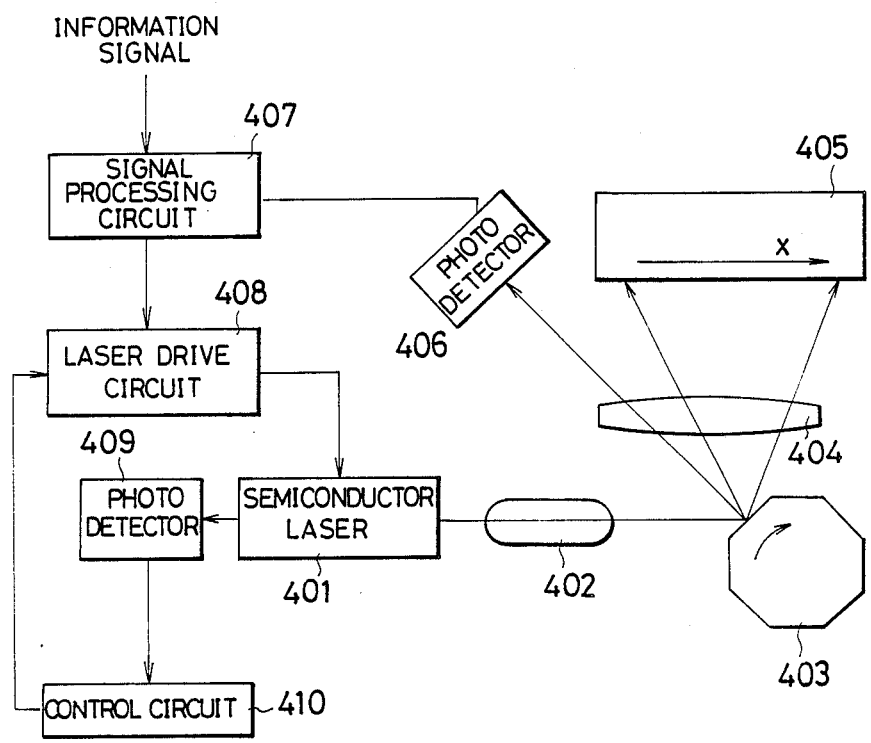
FIG. 1 is a constructional view of a laser printer.

FIG. 1 is a view showing one construction of the laser printer. In FIG. 1, laser beam generated from semiconductor laser 401 is collimated by collimator lens 402 and is deflected by photoscanning device 403 composed of a rotary polygon mirror. The deflected laser beam is then image-formed on a charged surface of photosensitive element 405 by f θ lens 404 and photosensitive element 405 is rotated at the same time when the image-formed spot is repeatedly moved in the direction of arrow X by the rotation of rotary polygon mirror 403. Photodetector 406 is disposed outside a region for writing information and detects the laser beam deflected by rotary polygon mirror 403 and generates a synchronization signal. Signal processing circuit 407 supplies an information signal (video data signal) to semiconductor laser drive circuit 408, and controls its timing by the synchronization signal from photodetector 406.

Semiconductor laser drive circuit 408 drives semiconductor laser 401 in accordance with the information signal from signal processing circuit 407. Accordingly, the laser beam modulated by the information signal is irradiated on photosensitive element 405, thereby forming an electrostatic latent image thereon. This electrostatic latent image is developed by a developing machine and transferred onto a sheet of paper, etc., by a transferring machine.

The laser beam emitted backwards from semiconductor laser 401 is incident onto photodetector 409 to detect the light intensity and an output light amount of semiconductor laser 401 is controlled to be constant by controlling semiconductor laser drive circuit 408 by control circuit 410 in accordance with an output signal of photodetector 409.

Figure 2A:
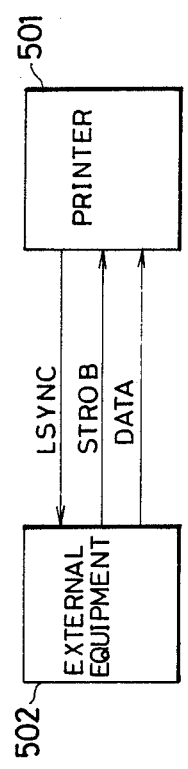
FIGS. 2a and 2b are respectively a schematically constructional view and a timing chart showing one example of a general transmission timing of image data.
Figure 2B:
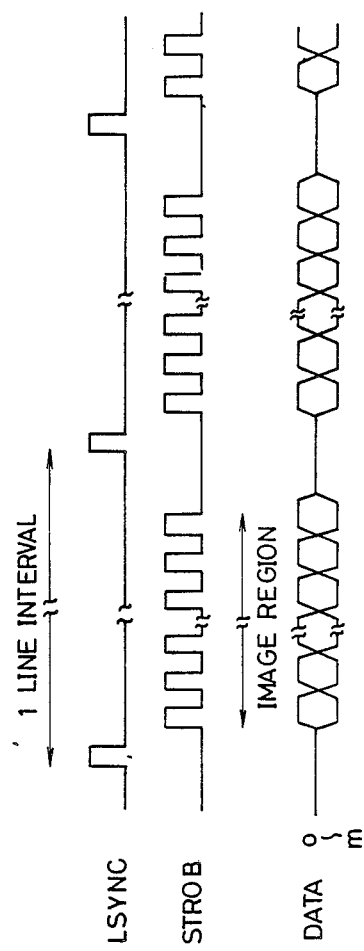

FIG. 2a and 2b are respectively a schematically constructional view and a timing chart for explaining one example of a transmission timing of image data. A horizontal synchronization signal LSYNC is outputted from printer 501 to external equipment 502 in accordance with the detected signal of photodetector 406 of FIG. 1. When the laser beam is deflected and scanned in the optically scanning system including rotary polygon mirror or deflector 403, the write speed on the side of printer 501 is determined by the rotary speed and the number of mirror faces of deflector 403. Further, the horizontal synchronization of the write operation on the side of printer 501 depends on signal LSYNC based on the detected signal from photodetector 406. Accordingly, it is necessary that the image data signal transferred from external equipment 502 are in synchronization with signal LSYNC from the side of printer 501. This case corresponds to a case in which the printer is provided with only a minimum memory amount. The image data DATA are transferred in synchronization with strobe signal STROB for discriminating the partition of the image data and showing a region for the image data.

In a general method for transferring the image data, the external equipment transfers the image data corresponding to one line amount in line-synchronization with signal LSYNC outputted from the printer side.

It is necessary that the rotary speed of the rotary polygon mirror shown in FIG. 1 is controlled with a high accuracy. This control operation is performed by the PLL(phase synchronization) control as mentioned above. When the rotary speed of the polygon mirror is unstable, jitter is caused in a dot position and the image quality is thereby deteriorated.

Figure 3:
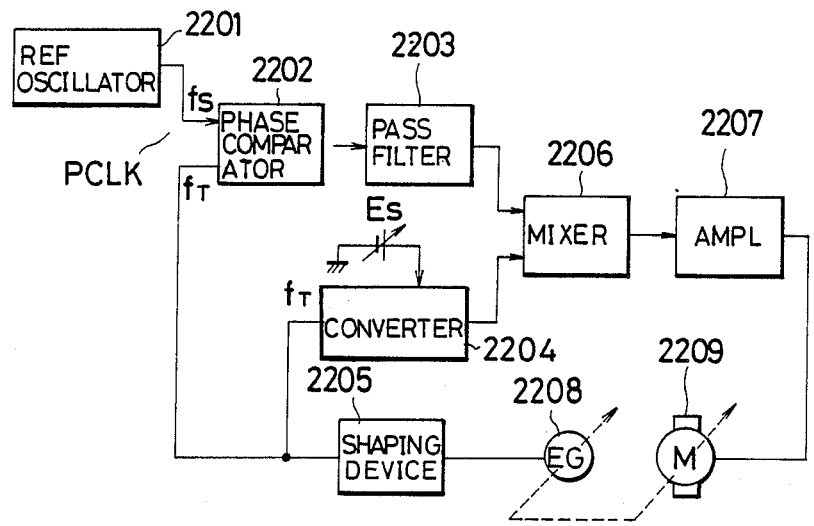
FIG. 3 is a block diagram of a drive control system of a deflector.

FIG. 3 is a block diagram of a motor control system for rotating the polygon mirror with a high accuracy using PLL and FG(frequency oscillator). In this figure, frequency signal $f_T$ is provided from an output of shaft encoder(FG) 2208 disposed in a shaft of motor 2209 through amplifying/shaping device 2205 and is compared in phase by phase comparator 2202 with oscillating frequency signal $f_S$ of reference oscillator 2201. An error signal between these frequency signals is converted to a phase voltage by low pass filter 2203 and is provided to mixer 2206 together with a signal based on frequency signal $f_T$ through frequency voltage converter 2204. As the difference in phase between frequency signals $f_T$ and $f_S$ becomes large, the output of low pass filter 2203 becomes large. The output of mixer 2206 is amplified by power amplifier 2207 and provided to motor 2209 as a drive electric power.

In this system, frequency signals $f_S$ and $f_T$ are in conformity with each other with respect to both phase and frequency, thereby controlling this system such that $f_S = f_T$.

When the number of rotations of motor 2209 is N rpm and frequency oscillator FG outputs a plurality of rectangular waves the number of which is represented by a in the following description, $$f_T = (N/60) \times a \ (Hz) \tag{1}$$

Since this system is controlled such that $f_T = f_S$, $$f_S = f_T = (N/60) \times a \ (Hz) \tag{2}$$

On the other hand, when the generating interval of horizontal synchronization signal LSYNC mentioned above is $T_{LSYNC}$ and the number of mirror faces of the polygon mirror is n, $$T_{LSYNC}=60/(n\times N) \text{ (Second)} \qquad (3).$$

From the above formulas (2) and (3), $$T_{LSYNC}=(a/n)\times(1/f_S) \text{ (Second)} \qquad (4).$$

Here, when $1/f_S$, i.e., the period of a reference signal from reference oscillator 2201 is $T_S$, the following relation $$T_{LSYNC}=(a/n)\times T_S \text{ (Second)} \qquad (5).$$

is obtained.

Figure 4:
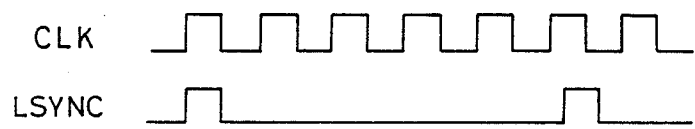
FIG. 4 is a view for explaining the relation between a basic clock signal and a line synchronization signal.

When clock signal CLK and signal LSYNC are constructed as shown in FIG. 4, $$T_{LSYNC}=(21/4)\times T_S \text{ (Second)} \qquad (6).$$

Here, when the clock signal having a high frequency with period $t(<T_S)$ is provided, $T_S$ and $T_{LSYNC}$ can be provided by partially dividing clock signal CLK in the following way, $$T_S=4t \qquad (7).$$

$$T_{LSYNC}=21t \qquad (8).$$

Since numbers n and a are respectively integer values in formula (5), a/n is an integer or specified fraction which is determined by the clock signal. Accordingly, when period t is set to be a suitable value, the following relation $$T_S=nt \qquad (9).$$

$$T_{LSYNC}=at \qquad (10).$$

can be held. Namely, $T_S$ and $T_{LSYNC}$ can be produced by partially dividing the clock signal having period t. This shows that $T_{LSYNC}$ completely synchronized with $T_S$ can be made.

As mentioned above, when the period of the rotary control signal of the rotary polygon mirror is $T_S$ and the period of the horizontal synchronization signal is $T_{LSYNC}$ and the period of basic clock signal CLK is t, relations $T_S=nt$ and $T_{LSYNC}=at$ are provided as shown in formulas (9) and (10).

The apparatus of the present invention generates a signal having a period equivalent to period $T_{LSYNC}$ of horizontal synchronization signal LSYNC generated when a rotary control signal of the rotary polygon mirror is provided to rotate the polygon mirror based on formula (9), by using period t of basic clock signal CLK as in formula (10). Namely when horizontal synchronization signal WLSYNC provided from an external equipment is provided on the basis of formulas (9) and (10), this signal is detected by photodetector 406 of FIG. 1 by performing deflection-scanning. Accordingly, although there is a difference in phase between horizontal synchronization signal WLSYNC and the really generated horizontal synchronization signal RLSYNC, a signal accurately in conformity with signal RLSYNC with respect to period is obtained.

Figure 5:
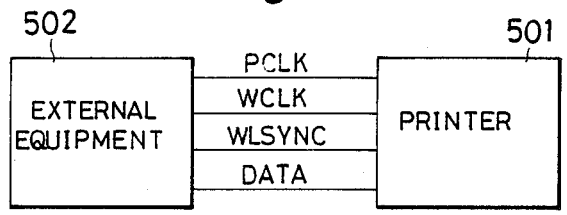
FIG. 5 is a block diagram for explaining the principle of a printer of the present invention.
Figure 6:
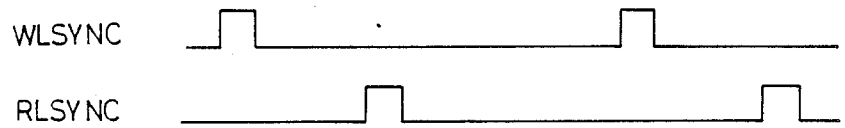
FIG. 6 is a timing chart for explaining the operation of the printer of FIG. 5.

FIG. 5 is a block diagram for explaning the principle of the printer of the present invention. FIG. 6 is a timing chart for explaining the operation of the printer of the present invention. In these figures, clock signal PCLK for driving the rotary polygon mirror of printer 501 and horizontal synchronization signal WLSYNC are provided from external equipment 502. Image data signal DATA and image clock signal WCLK are transmitted in synchronization with signals PCLK and WLSYNC. Such a construction constitutes a characterizing portion of the present invention.

An embodiment of the printer of the present invention will next be described with reference to the accompanying drawings.

In FIG. 5, when the horizontal synchronization signal provided from the rotary polygon mirror of printer 501 is represented by RLSYNC and the horizontal synchronization signal supplied from external equipment 502 is represented by WLSYNC, the following formula $$T_{RLSYNC}=(a/n)\times T_{PCLK} \qquad (11)$$

is obtained from the relation between formulas (9) and (10).

Here, $T_{RLSYNC}=T_{WLSYNC}$ is provided, but the phases of these two horizontal synchronization signals are not in conformity with each other as shown in FIG. 6. Accordingly, a shift is caused between timings when printer 501 receives and writes out the image data.

Figure 7:
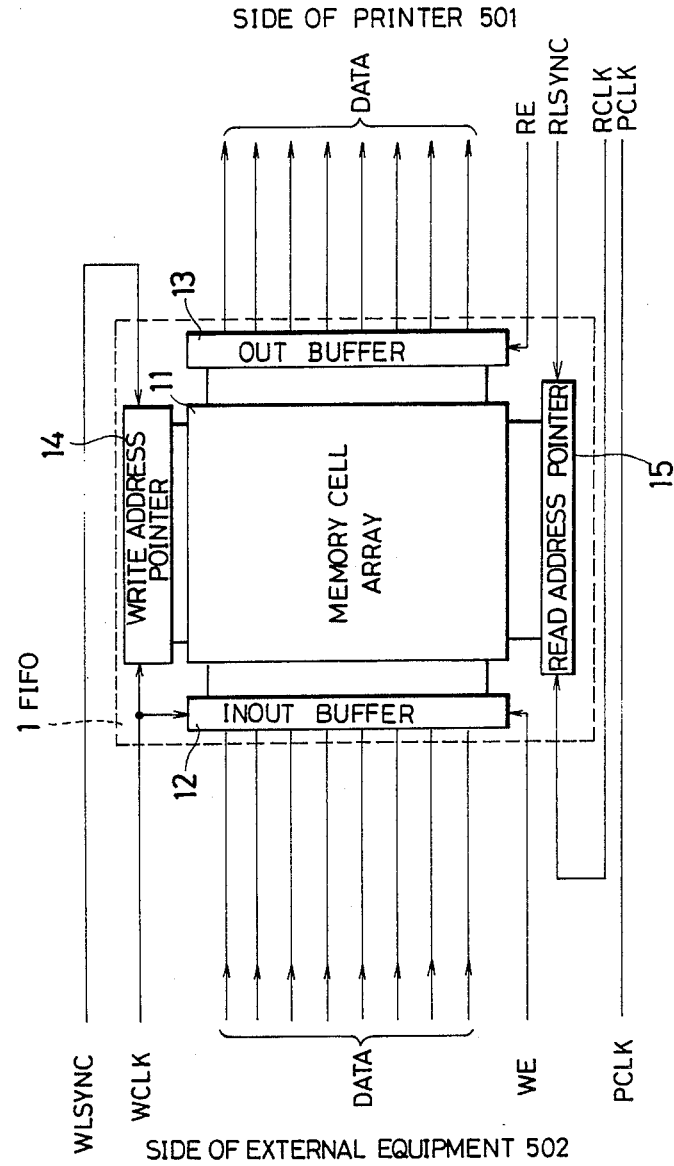
FIG. 7 is a constructional view of the printer in accordance with one embodiment of the present invention.

FIG. 7 is a constructional view of the printer in a first embodiment of the present invention for solving the shift between the above-mentioned timings.

FIG. 7 shows a construction in which FIFO is used as a buffer memory for performing the input and output operations at a high speed between the printer and the external equipment. Reference numeral 1 designates FIFO(e.g., μ PD42505C), 11 a memory cell array thereof, 12 an input buffer, 13 an output buffer, 14 a write address pointer, and reference numeral 15 designates a read address pointer. Further, reference numeral WE designates a write enable signal and reference numeral RE designates a read enable signal.

In this figure, since the read and write operations are simultaneously performed in FIFO, there is no problem about the difference in phase between signals RLSYNC and WLSYNC as in the following description.

On the input side of FIFO 1, the number of write addresses is counted by clock signal WCLK and the counted write addresses are written to a memory. Then, write address pointer 14 is reset by signal WLSYNC. On the output side of FIFO 1, with respect to the already written memory cells, read addresses are read by signal RCLK from the side of printer 501 while the number of read addresses is counted. When signal RLSYNC is inputted to read address pointer 15, read address pointer 15 is reset to 0.

Figure 8:
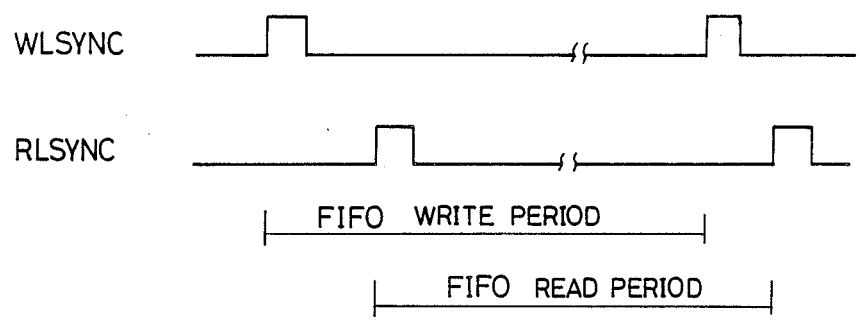
FIG. 8 is a timing chart for explaining the operation of the printer of FIG. 7.

FIG. 8 is a timing chart for explaining the operation of constructional elements of FIG. 7. In this figure, the write and read periods of FIFO are respectively shown by time intervals in which signals WLSYNC and RLSYNC are reset.

Accordingly, in this embodiment, even when there is a shift in phase between signals WLSYNC and RLSYNC, the image data can be accurately written or printed.

The memory can be constructed by using at least three line buffers.

Figure 9:
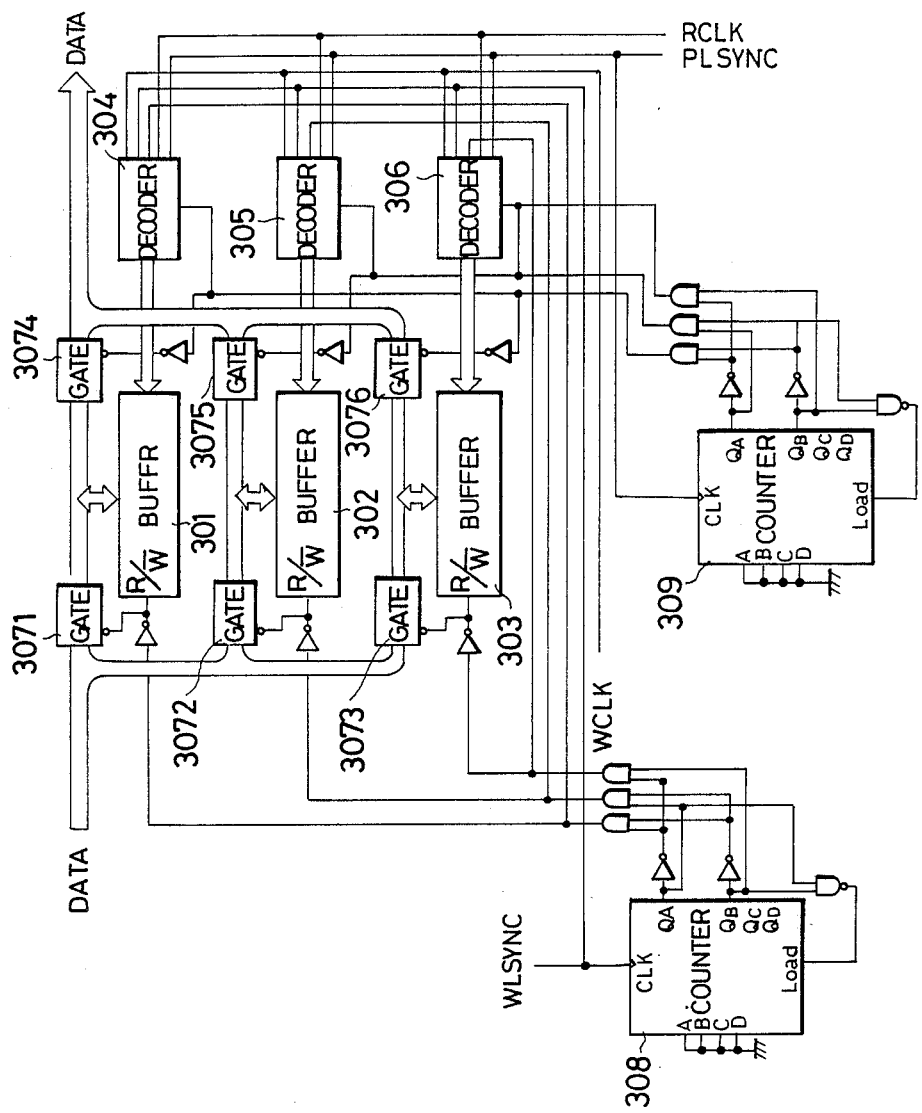
FIG. 9 is a constructional view of the printer in accordance with a second embodiment of the present invention.

FIG. 9 is a view showing the construction of the printer in a second embodiment of the present invention in which three line buffers are used.

In this figure, reference numerals 301, 302 and 303 designate line buffers, 304, 305 and 306 address decoders, 3071 to 3076 gates, 308 a write counter(which is called W counter in the following description), and reference numeral 309 designates a read-out counter(-which is called R counter in the following description).

W counter 308 and R counter 309 are ternary counters and select line buffers 301, 302 and 303 when the counted values of these counters are respectively 0, 1 and 2.

Figure 10:
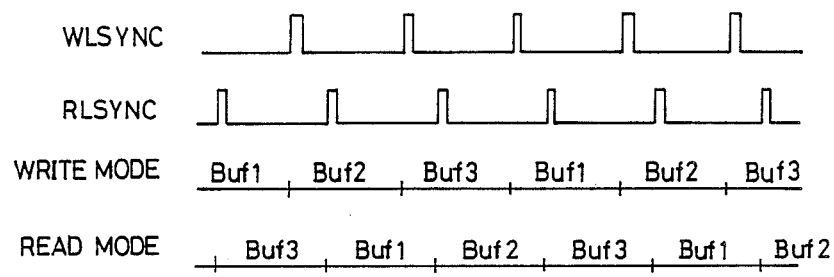
FIGS. 10 and 11 are timing charts for explaining the operation of the printer of FIG. 9.
Figure 11:
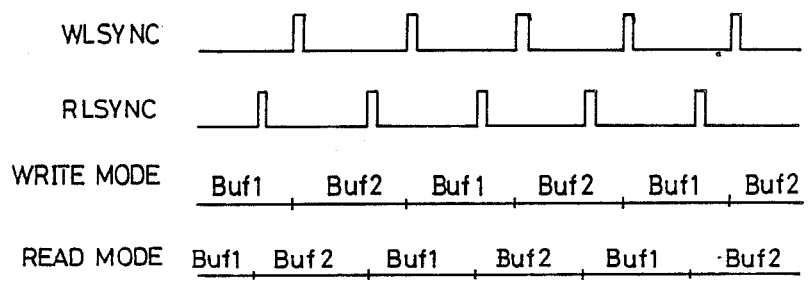

FIGS. 10 and 11 are timing charts for explaining the operation of constructional elements of FIG. 9. As shown in FIG. 10, the read operation is performed with respect to line buffer 3 when the write operation is continuously performed with respect to line buffer 1 and 2, and the read operation is performed with respect to line buffer 1 when the write operation is performed with respect to line buffers 2 and 3. Accordingly, the write and read operations are not simultaneously performed with respect to one line buffer.

FIG. 11 shows a case in which two line buffer are used. In this figure, even when the two line buffers are allocated every each line, the write and read operations overlap each other in write and read modes so that the normal operation cannot be performed. Accordingly, it is necessary to dispose at least three line buffers.

W counter 308 in FIG. 9 constitutes a write selector for selecting line buffers 1, 2 and 3 through gates 3071 to 3073 in accordance with the input of signal WLSYNC. R counter 309 selects and access line buffers 1, 2 and 3 through gates 3074 to 3076 in accordance with the input of signal RLSYNC. Address decoders 304, 305 and 306 designate addresses of the respective line buffers when the write and read-out operations are performed.

In accordance with this embodiment, since the write operation of the printer is controlled by the external equipment, the transmission of the image data does not depend on the operation of the printer and a plurality of printers are easily connected in parallel to each other and are easily operated.

As mentioned above, for example, in the conventional copying machine, a read system for reading a manuscript and a record system for recording an image based on electrical image information are operated by the same basic clock signal to reliably synchronize these systems with each other, thereby reproducing the image accurately. When the read and record systems are separated from each other and are separately arranged from each other, it is preferable that these systems are operated by respectively independent clock signals since the number of signal lines is reduced and it is not necessary to dispose a complicated signal modulating system. In this case, as in the above embodiment, the read and record systems are connected to each other through a buffer memory so as to reliably transmit an image signal between the read and record systems. Namely, after the read system is first operated with the buffer memory for storing the image data read in the read system leaving a certain margin, the record system is then operated and the record operation is performed on the basis of the image data stored to the buffer memory. In such a system, when the buffer access operation of one system overlaps the buffer access operation of the other system, a disturbance is caused with respect to the image data. In such a case, the operation of the other system following the one system is interrupted for a suitable time. However, when the capacity of the buffer memory is small, the number of interruptions becomes large or the interrupting time becomes longer, which is not efficient in operation. Further, when the capacity of the buffer memory is increased, the cost of the apparatus is increased, which is not preferable economically. The above-mentioned system cannot be applied when the read and record systems, which cannot be constructionally interrupted in operation, are used. Japanese Laid-Open Patent No. 60-229570 discloses a system relating to the above-mentioned system. However, in the system of this patent, one line unit of the image signal is apparently lost or overlaps.

Therefore, as in the above-mentioned embodiment, the operation of the deflector for deflecting and scanning the laser beam in the record systems is controlled from the exterior so that the read and record systems are reliably synchronized with each other and the image clock signals may be independently provided. In the read and record systems which are not provided with a large buffer memory, the respective operations thereof must be performed at an approximately same speed. However, in general, the scanning period rate is about 70% when the beam is deflected and scanned in the record system, and the scanning period rate in the record system is smaller than that in the read system. The image clock of the record system is determined by engine line speed, scanning period rate and image density. Even when the image clock signal of the record system needs a high frequency about 10 MHz in the optical system in which the scanning period rate is about 70%, the frequency of the image clock signal of the read system is reduced to a frequency about 7 MHz having ratio 70% to 10 MHz, thereby reading the image with a preferable S/N ratio or performing the image processing. In this synchronization system, since it is possible to synchronize a plurality of record systems with each other, the system is preferable as a synchronization system used for a color printer, etc. provided with a plurality of deflectors.

Figure 12:
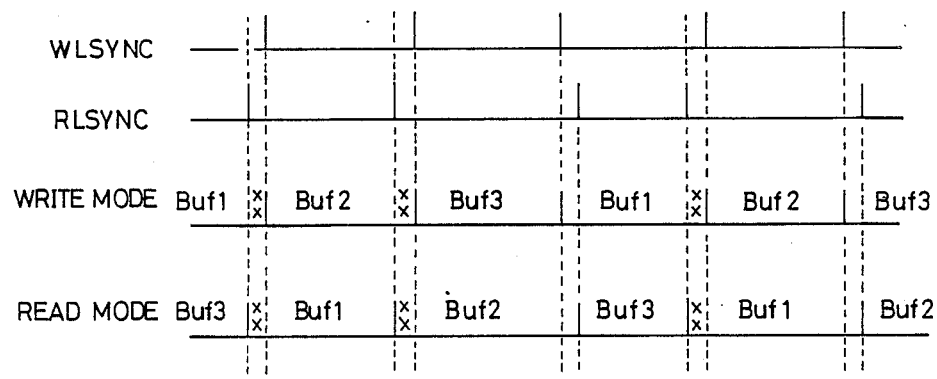
FIG. 12 is a view for explaining shift of a line synchronization signal.

As in the embodiment shown in FIG. 10, there is no problem when horizontal synchronization signal WLSYNC from the exterior of the printer is sufficiently different in phase from horizontal synchronization signal RLSYNC generated in the interior of the printer. However, as shown in FIG. 12, when the difference in phase between these signals is small and the preceding and following relations are reversed with respect to signals WLSYNC and RLSYNC, the signals cannot be suitably aligned or conformed to each other.

The interval of signal RLSYNC is changed since the deflector is not rotated regularly and the mirror face of the rotary polygon mirror is not divided accurately and is not manufactured with a high accuracy and is not formed well, etc. FIG. 12 strengthens the change of this signal to clarify the generating situation thereof, but such a change caused by the above reasons almost does not occur in the real situation. In this figure, the portions shown by mark x designate portions in which signals WLSYNC and RLSYNC overlap each other and thereby are not aligned with each other. The generating rate of such a situation is low and is represented by $\Delta t/t \times 100\%$ when the time interval of signal RLSYNC is t and the variation width thereof including the variation width of signal WLSYNC is $\Delta t$.

Figure 13:
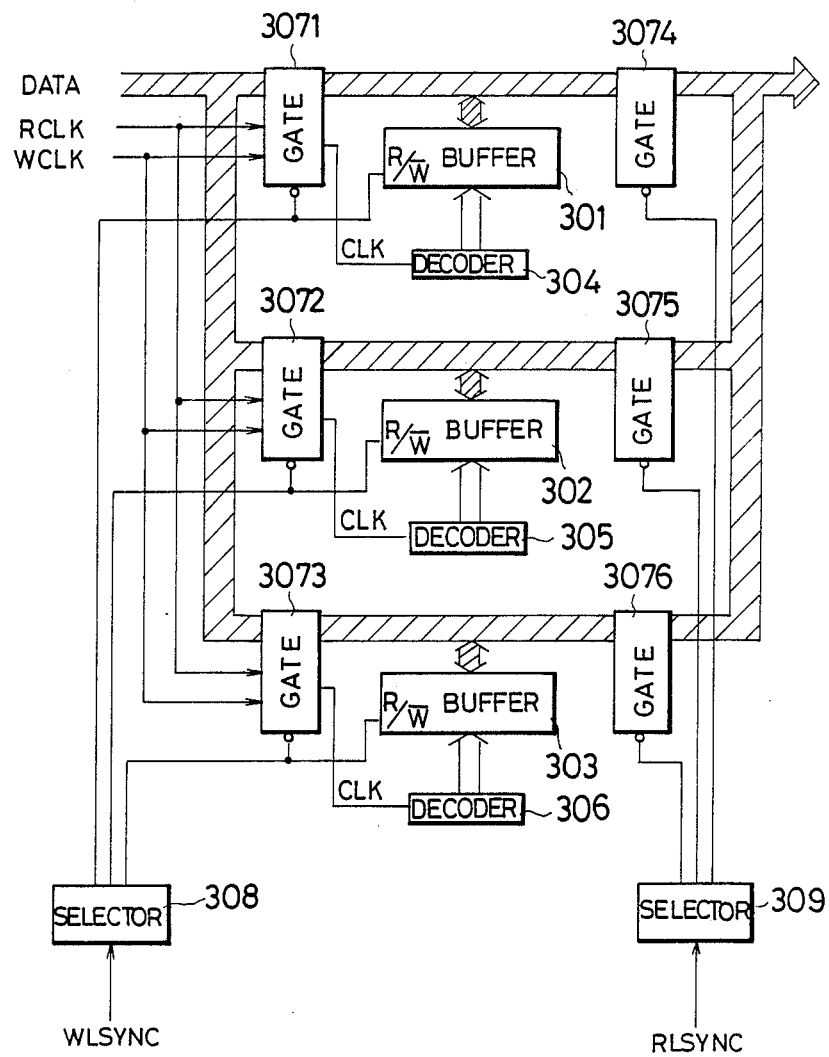
FIG. 13 is a block diagram showing a simplified construction of the printer of FIG. 9.

FIG. 13 is a block diagram schematically showing the circuits of the second embodiment of the present invention shown in FIG. 9. As mentioned above, write selector 308 and read selector 309 sequentially select respective line buffers 301, 302 and 303 by signals WLSYNC and RLSYNC, respectively. Namely, one of gates 3071, 3072 and 3073 is selected and image data signal DATA passes therethrough and is inputted to respective line buffers 301, 302 and 303. Simultaneously, one of signals WCLK and RCLK is selected and operates address decoders 304, 305 and 306. When DATA is stored to the line buffers, the address decoders are operated by clock signal WCLK inputted from the exterior, e.g., a clock signal of the read system. Simultaneously, one line buffer except for the line buffer selected by the W selector is selected by the R selector, thereby passing DATA therethrough from gates 3074 to 3076.

Figure 14:
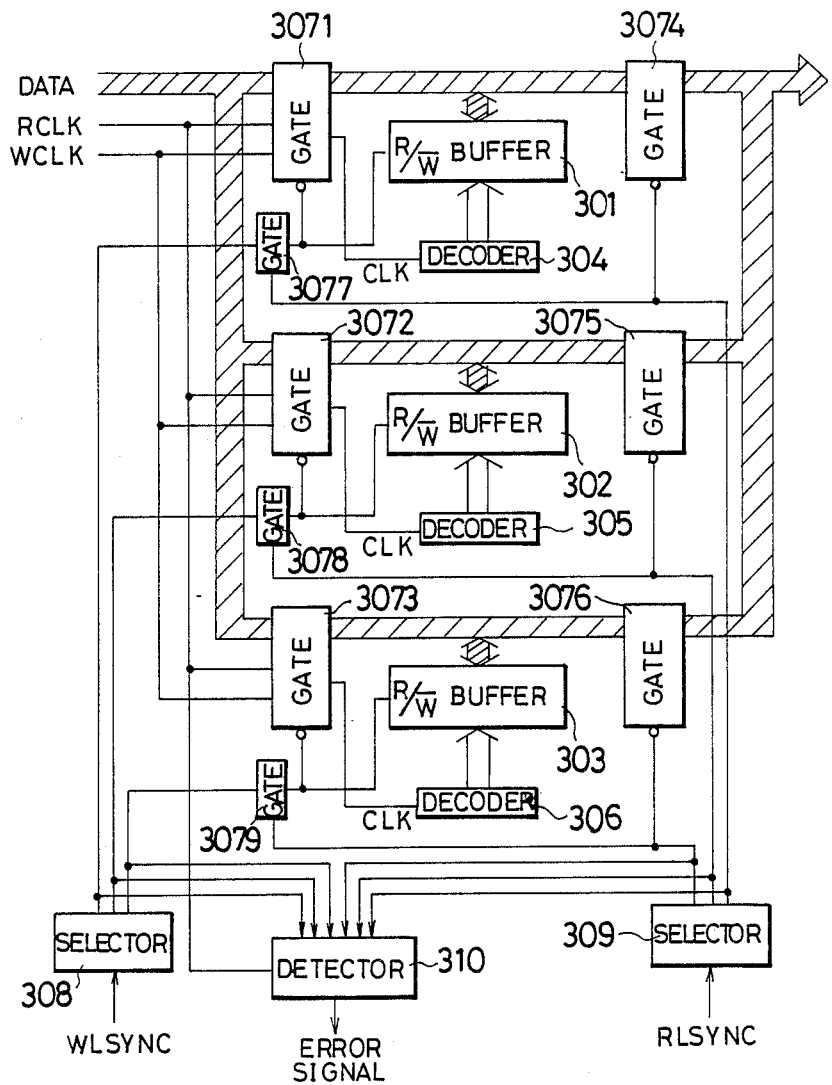
FIG. 14 is a view showing the construction of the printer in accordance with a third embodiment of the present invention.

FIG. 14 is a constructional view of the printer in accordance with a third embodiment of the present invention and is similar to FIG. 13 with respect to the basic construction. In this figure, the apparatus adds gates 3077, 3078 and 3079 for selecting the R selector prior to the W selector when the same line buffer is selected from both W and R selectors, and error detector 310 for generating an error signal in an unwritable region in which it is impossible to perform the write operation.

Figure 15:
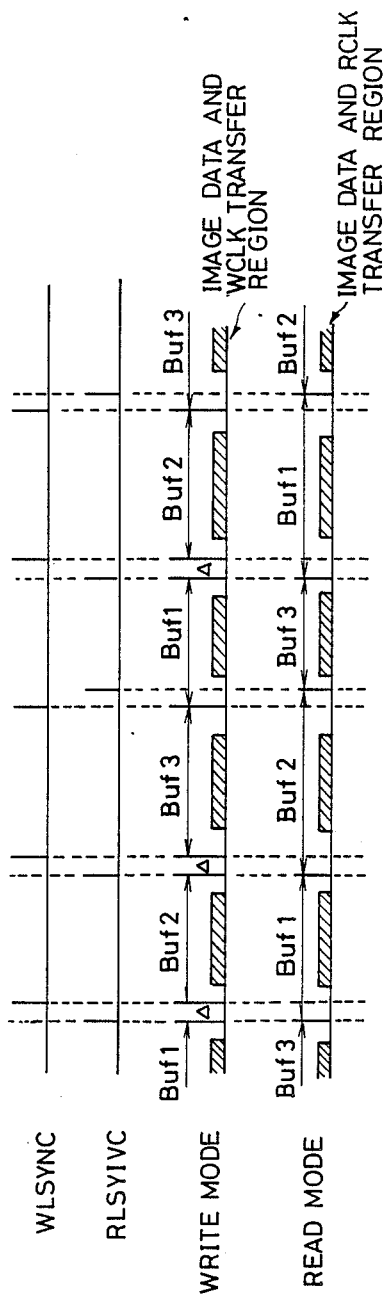
FIG. 15 is a view for explaining the operation of constructional elements of FIG. 14.

FIG. 15 is a view for explaining the operation of constitutional elements of FIG. 14. In this figure, portions in which the same line buffer is selected in both write and read modes are designated by mark Δ. With respect to these portions, the selection by the read selector is performed prior to the selection by the write selector.

Accordingly, no line buffer attains the write mode, but in general, the image data are transferred with a margin with respect to the time interval of each signal LSYNC.

Since the time interval of signal RLSYNC is varied very slightly, no backwardly located portion of the image data is lost at the time of the write mode in almost every case. Further, the most important point in such a method is that the memory and the peripheral circuits can be prevented from being damaged by interference of the selecting signals from write selector 308 and read selector 309.

Error detector 310 monitors signal RCLK and the respective selecting signals from write selector 308 and read selector 309, and detects whether or not image data DATA overlap each other in the above-mentioned unwritable region. When the image data overlap each other, error detector 310 outputs an error signal. Signal RCLK is a clock signal showing a partition of image data DATA every one picture element, and is in conformity with the image data region.

In addition, it may be judged whether or not the image data are directly inputted to the error detector and are located in the image data region by density of the image data, etc.

FIG. 14 shows the example using three line buffers, but it is apparently seen from the above description that more than three line buffers may be used.

In accordance with the above-mentioned embodiment, since the write and read modes of the buffer memory do not overlap each other, the apparatus can prevent damage of the data, abnormal image output, damages of the memory and other circuits, etc. Further, when the periods of signals WLSYNC and RLSYNC are in conformity with each other, the damage of the data, the abnormal image output, the damages of the memory and other circuits, etc. can be prevented even when there is any phase relation between these signals and there is a slight variation in period between these signals.

As mentioned above, line synchronization signal WLSYNC from the exterior of the apparatus and the image data in synchronization with signal WLSYNC are supplied and written to the memory. The written image data are called WDATA in the following description. In the interior of the printer, the image data are read out of the memory by synchronization detector output signal RLSYNC for synchronizing the laser beam deflected by the deflector or rotary polygon mirror, etc., prior to the write operation of the image data. The image data read out of the memory are called RDATA in the following description. At this time, there is a case in which the data are simultaneously accessed in the write and read-out operations with respect to the memory by the timings of signals WLSYNC and RLSYNC so that the memory is operated in error and the peripheral circuits are damaged and the data are lost and so on.

Figure 16:
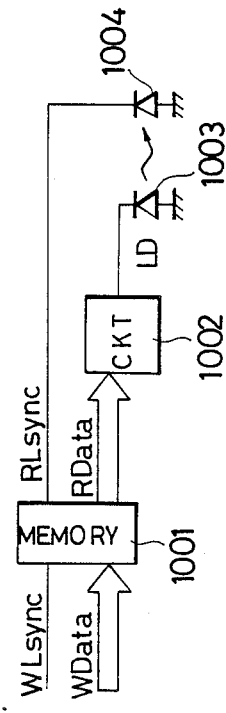
FIG. 16 is a schematically constructional view for explaining a data write operation by an external synchronization signal and a data taking-out operation by an internal synchronization signal.
Figure 17:
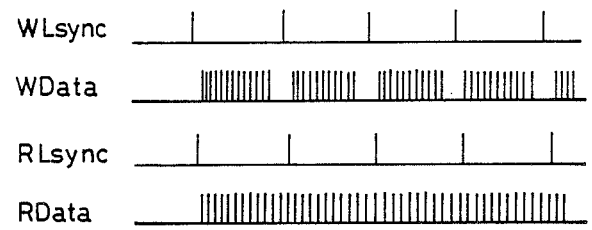
FIG. 17 is a timing chart for explaining the operation of constructional elements of FIG. 16.

FIG. 16 is a schematic view of the above constructional elements in which signal WLSYNC and data WDATA in synchronization therewith are supplied from the exterior of the apparatus and data RDATA are taken out by internal signal RLSYNC. FIG. 17 is a timing chart for explaining the operation of the constructional elements of FIG. 16.

In FIGS. 16 and 17, WDATA in synchronization with signal WLSYNC is written to buffer memory 1001 and RDATA is provided in synchronization with signal RLSYNC from synchronization detector 1004 in the interior of the printer. RDATA is provided to laser diode 1003 through modulating circuit 1002 to perform the record operation.

Figure 18:
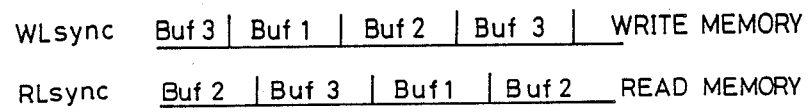
FIG. 18 is a view for explaining a red-out timing of a memory.
Figure 19:
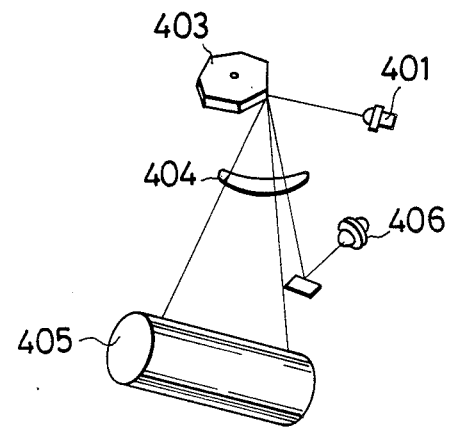
FIG. 19 is a view for explaining a taking-out operation of the internal synchronization signal.
Figure 20:
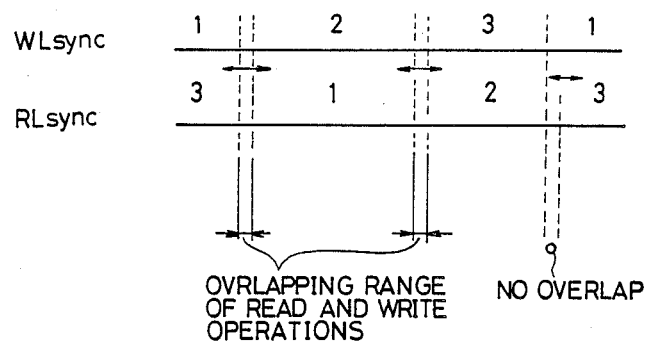
FIG. 20 is a view for explaining the data write and read-out timings.

FIG. 18 is an explanatory view of the above constructional elements in which buffer memories on three lines are used to provide a memory read-out timing. When the data are written to the memory by signal WLSYNC in a sequential order 1, 2, 3, 1, ---with respect to line buffers 1, 2 and 3, the data can be read out since there is one vacant line buffer among the three line buffers at any time. However, as shown in FIG. 19, signal RLSYNC is produced by deflecting the laser beam by deflector 403 such as rotary polygon mirror, holodisk, etc. and receiving the deflected laser beam by synchronization detector 46. Accordingly, there is a case in which signal RLSYNC becomes an unstable signal by the accuracy in deflector and the characteristics of a photodiode as the synchronization detector. Therefore, when the timings of signals WLSYNC and RLSYNC are close to each other as shown by the relation therebetween in FIG. 20, there is a possibility in which the write and read operations of the memory overlap each other. At this time, as mentioned above, the memory and the peripheral signal processing circuits are damaged and the data are lost by mixing the inputted and outputted data of the memory with each other and so on. Japanese Laid-Open Patent No. 60-229570 discloses a method for solving this problem. However, in the system of this patent, when the read and write operations begin to be simultaneously performed with respect to the memory, the following two steps (a) and (b) are taken. In step (a), when the write operation with respect to the memory has been completely performed and a memory to be next selected is being accessed in the read operation, the data are rewritten to the memory written just before. In step (b), when the read operation has been completely performed and the read data are being written to a memory to be next selected, the previous memory is read out again. Thus, no interference is caused with respect to the timings of the above signals.

However, in the case of step (b), the same memory is read twice and false data are outputted on one line with respect to the data provided from the read device or the external equipment, etc. Accordingly, the reproducibility of fine lines is reduced and the situation in step (b) is caused at many times while the image on one page is outputted so that the image quality or the image resolution is extremely reduced and the function as a printer is also reduced. To attain steps (a) and (b), it is necessary to monitor the access situation of the respective memories by CPU at any time, thereby increasing the cost of the apparatus and making the apparatus complicated.

Figure 21:
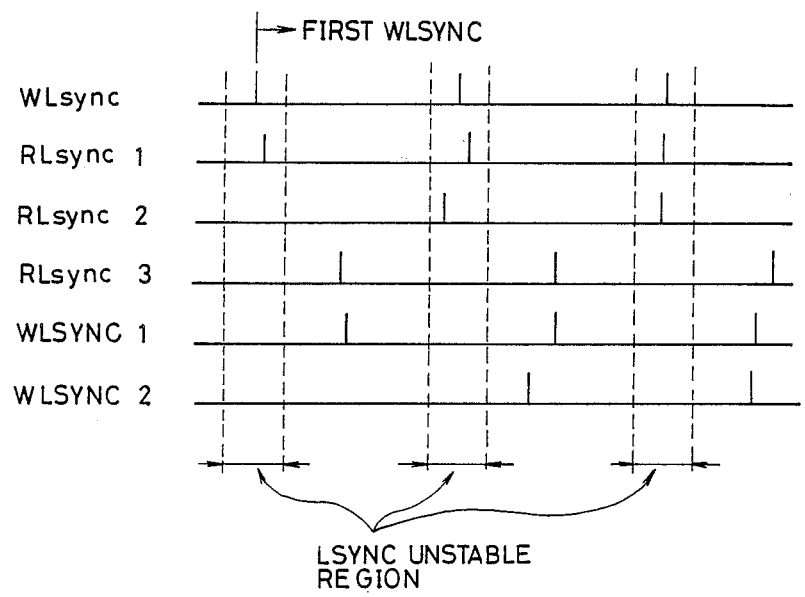
FIG. 21 is a view for explaining the printer in accordance with a fourth embodiment of the present invention.

FIG. 21 is an explanatory view of the printer in a fourth embodiment of the present invention. In this figure, to solve the above problems, when signals WLSYNC and RLSYNC are located at interfering timings of the read and write operations with respect to the memory, signal WLSYNC is delayed to prevent the memory and the peripheral circuits from being damaged.

In FIG. 21, when signal RLSYNC is located in an unstable region as shown by marks ① and ② with respect to signal WLSYNC, signal WLSYNC is delayed by a constant time and outputted as in marks ① and ②. When signal RLSYNC is located in a stable region as shown by mark ③, signal WLSYNC is outputted as it is.

Figure 22:
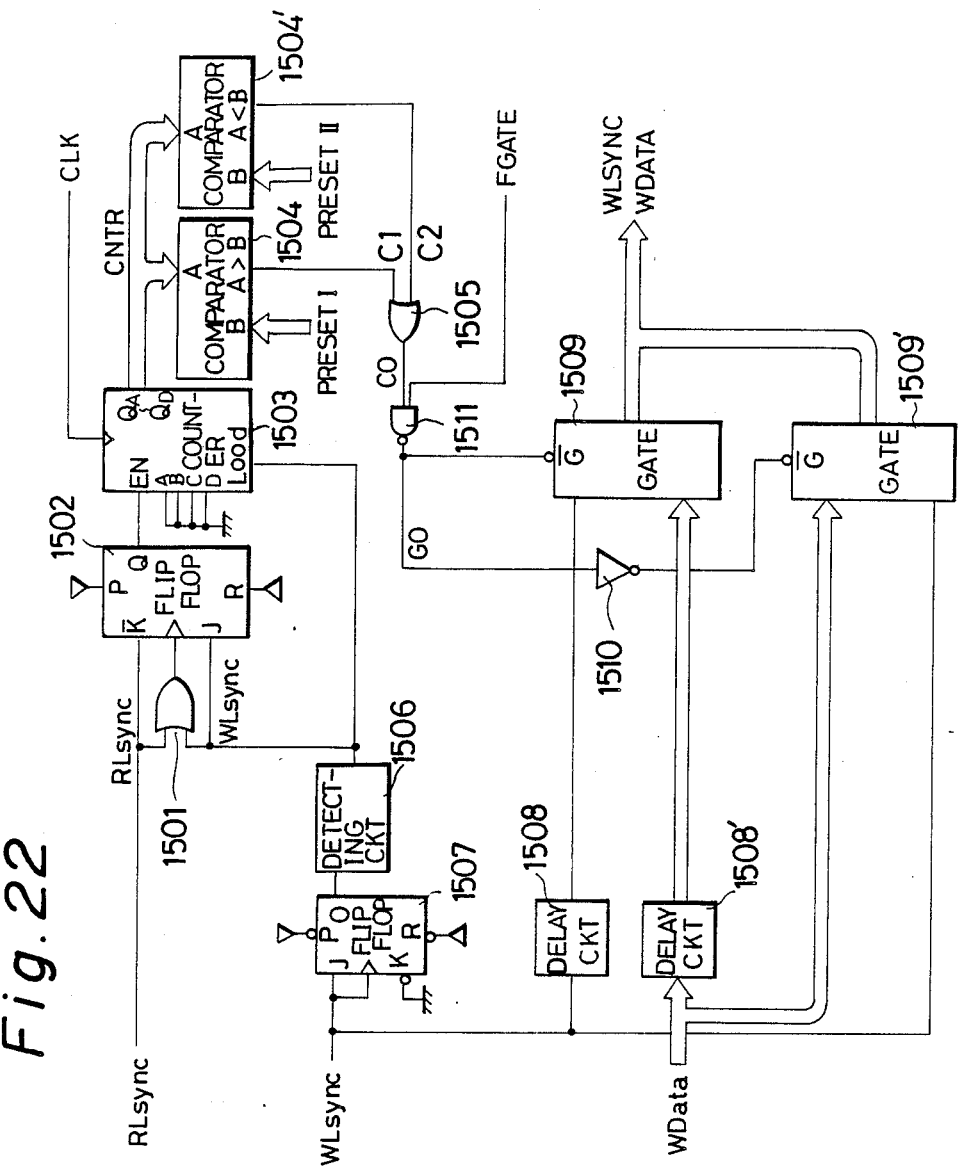
FIG. 22 is a view showing constructional elements in the embodiment of FIG. 21.

FIG. 22 is a constructional view of the printer in the fourth embodiment of the present invention. In this figure, reference numerals 1501 and 1505 each designate a NOR circuit, 1502 and 1507 a flip flop, 1503 a counter, 1504 and 1504' a comparator, 1506 an edge detecting circuit, 1508 and 1508' a delay circuit, 1509 and 1509' a gate circuit, 1510 an inverter, and reference numeral 1511 designates a NAND circuit.

Figure 23:
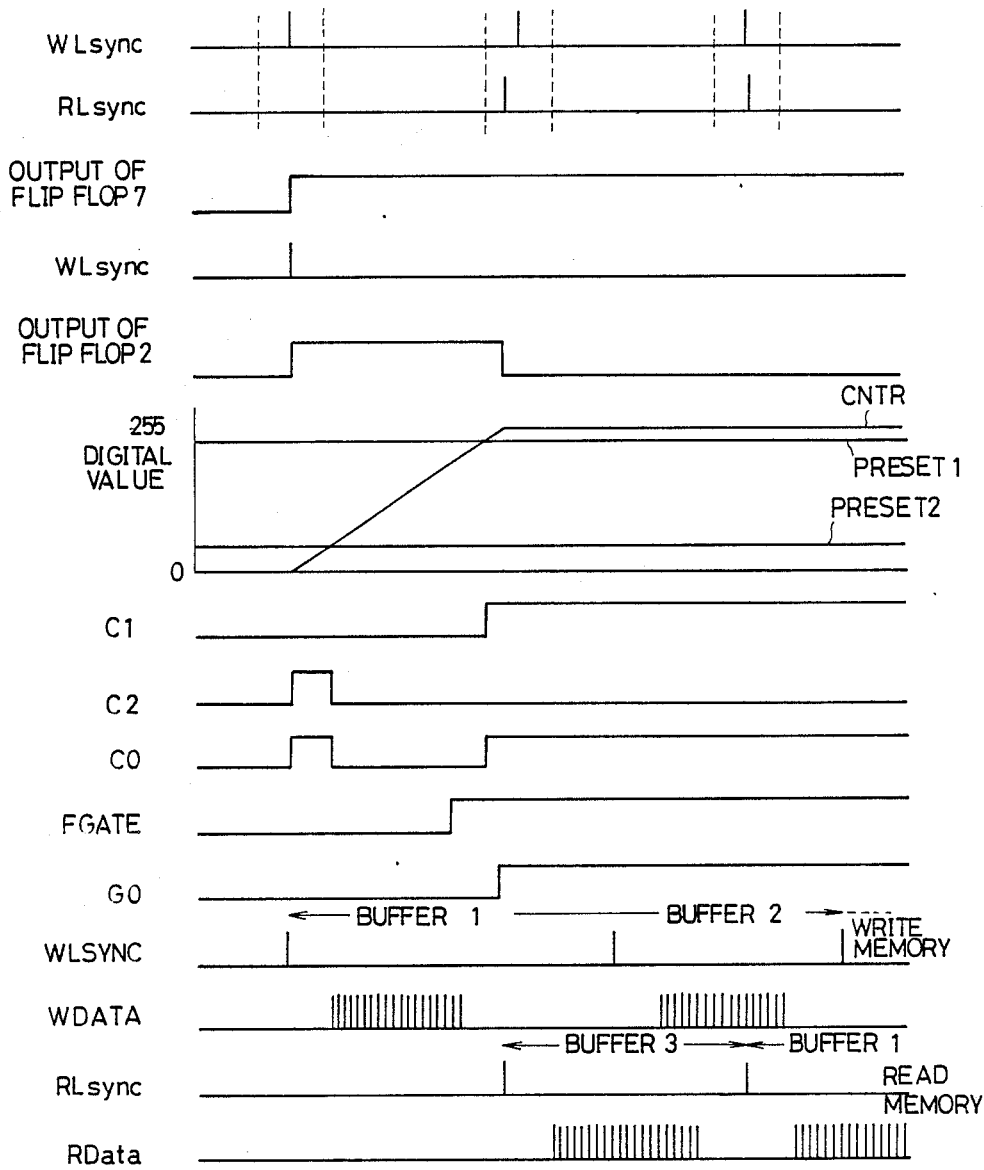
FIG. 23 is a timing chart for explaining the operation of the constructional elements of FIG. 22.

FIG. 23 is a timing chart for explaining the operation of the printer of FIG. 22 and illustrates a case of the timing shown by ② of FIG. 21.

As mentioned above, to prevent the timings of signals RLSYNC and WLSYNC from being located in both the unstable and stable regions by swinging of signal RLSYNC, a judging circuit is operated by only a first rise of signal WLSYNC and a first rise of the subsequent signal RLSYNC.

In FIG. 22, a first pulse of signal WLSYNC is detected by flip flop 1507 and edge detector 1506 and this detected output is set to be signal WLSYNC'.

An output of flip flop 1502 is set in the rise of signal WLSYNC' and reset in the rise of signal RLSYNC. When the output of flip flop 1502 is at high level H in voltage, i.e., when an enable terminal input of counter 1503 is at high level H in voltage, counter 1503 loads data(=0) by signal WLSYNC'. Then, counter 1503 begins to perform the counting operation by signal CLK with a certain frequency dividing ratio at which the counting operation is performed until just 255 in the period of signal WLSYNC. At this time, first, output C2 of comparator 1504' attains the H level since the counted value is smaller than present value II of comparator 1504'. Thereafter, when the counted value becomes greater than preset value II, output C2 attains low level L in voltage. When the counting operation is further performed and the counted value becomes greater than preset value I of comparator 1504, output C1 of comparator 1504 attains the H level. This output is provided to NAND circuit 15011 together with signal FGATE attaining the H level in an image forming period, and an output of NAND circuit 15011 constitutes gate signal GO of each of gates 1509 and 1509'. At this time, the write operation of the memory is performed by signals WLSYNC and WDATA undelayed on the first one line at any time. Accordingly, at the timing as shown in FIG. 23, only the first pulse signal WLSYNC is longer in time interval than the subsequent signal WLSYNC, but there is no problem during this time interval since this time interval constitutes a region which no WDATA is provided. The same argument holds true in the case of timing shown in FIG. 21, too. Thus, even in the abovementioned embodiment, when the printer is controlled by the external equipment, i.e., when the image data and the line synchronization signal are supplied from the exterior of the printer, there is no interference of the read and write operations of a plurality of line memories at any timing between an external line synchronization signal for writing the data to the memory from the exterior and an internal line synchronization signal for reading the data out of the memory to internally output the image. Accordingly, the memory and the peripheral circuits can be prevented from being damaged and the data can be prevented from being lost.

As mentioned above, in accordance with the present invention, a deflecting synchronization signal and a line synchronization signal of the printer are provided from the external equipment such that the image data are transferred from the external equipment to the printer. Accordingly, the printer can be efficiently controlled by less memories and a plurality of printers can be easily operated in parallel to each other.

Many widely different embodiments of the present invention may be constructed without departing from the spirit and scope of the present invention. It should be understood that the present invention is not limited to the specific embodiments described in the specification, except as defined in the appended claims.

We claim:

1. A laser printer comprising:
   laser modulating means for modulating a laser in response to image data transferred thereto and for irradiating the modulated laser;
   rotary deflecting means for deflecting the modulated laser irradiated thereto from said laser modulating means onto a recording medium, a rotation thereof being controlled by a rotary signal supplied thereto in a predetermined period;
   synchronization detecting means for receiving the deflected laser irradiated thereto from said rotary deflecting means in the vicinity of said recording medium and outputting a synchronization signal defining a timing which said laser modulating means starts to modulate;
   at least three memory means each capable of storing the image data corresponding to one line defined by one deflection of said rotary deflecting means; and
   memory control means for writing the image data inputted from an exterior of said printer in one memory means after switching said one memory means to a write operation in synchronism to the rotary signal defining said one line, reading the image data written in said one memory means after switching said one memory means to a read operation, and transferring the read image data to said laser modulating means.

2. A laser printer according to claim 1, wherein said printer further comprises rotary signal generating means disposed an exterior of said printer for generating the rotary signal.

3. A laser printer according to claim 1, wherein said printer further comprises rotary signal generating means disposed an interior of said printer for generating the rotary signal.

4. A laser printer according to claim 2 or 3, wherein said printer further comprises a first selecting means for sequentially selecting the one memory means to write the image data and a second selecting means for sequentially selecting the one memory means to read the image data.

5. A laser printer according to claim 4, wherein said printer further comprises means for selecting the one memory means by said second selecting means when the one memory means is simultaneously selected by said first selecting means and said second selecting means.

6. A laser printer according to claim 4, wherein said printer further comprises means for delaying an operation of said first selecting means in one time in which the one memory means is simultaneously selected by said first selecting means and said second selecting means.

7. A laser printer comprising:
laser modulating means for modulating lasers in response to image data transferred thereto and for irradiating the modulated lasers;
a plurality of rotary deflecting means for each deflecting the modulated laser irradiated thereto from said laser modulating means onto a recording medium, each rotation thereof being controlled by each of rotary signals supplied thereto in a predetermined period;
a plurality of synchronization detecting means for each receiving the deflected laser irradiated thereto from the corresponding rotary deflecting means in the vicinity of said recording medium and each outputting a synchronization signal defining a timing which said laser modulating means starts to modulate;
a plurality of memory means each capable of storing the image data corresponding to one line each defined by one deflection of each of said rotary deflecting means; and
memory control means for each writing the image data inputted from an exterior of said printer in each of memory means after switching each of memory means to a write operation in synchronism to the rotary signal each defining the one line, each reading the image data written in each of said memory means after switching each of said memory means to a read operation, and each transferring the read image data to said laser modulating means.

8. A laser printer according to claim 7, wherein said printer further comprises rotary signal generating means disposed an exterior of said printer for generating each of the rotary signals.

9. A laser printer according to claim 7, wherein said printer further comprises rotary signal generating means disposed an interior of said printer for generating each of the rotary signals.

10. A laser printer according to claim 8 or 9, wherein said printer further comprises a first selecting means for sequentially selecting each of said memory means to write the image data and a second selecting means for sequentially selecting each of said memory means to read the image data.

11. A laser printer according to claim 10, wherein said printer further comprises means for selecting one memory means by said second selecting means when the one memory means is simultaneously selected by said first selecting means and said second selecting means.

12. A laser printer according to claim 10, wherein said printer further comprises means for delaying an operation of said first selecting means in one time in which the one memory means is simultaneously selected by said first selecting means and said second selecting means.

* * * * *